United States Patent
Bartels et al.

(10) Patent No.: US 10,544,878 B2
(45) Date of Patent: Jan. 28, 2020

(54) FLOW CONTROL ASSEMBLY FOR SUBSEA APPLICATIONS

(71) Applicant: FORUM US, INC., Houston, TX (US)

(72) Inventors: Heinrich Bartels, Houston, TX (US);
John Thompson, Newcastle upon Tyne (GB)

(73) Assignee: FORUM US, INC., Houston, TX (US)

( * ) Notice: Subject to any disclaimer, the term of this patent is extended or adjusted under 35 U.S.C. 154(b) by 4 days.

(21) Appl. No.: 15/811,859

(22) Filed: Nov. 14, 2017

(65) Prior Publication Data
US 2019/0145545 A1    May 16, 2019

(51) Int. Cl.
*F16K 47/02* (2006.01)
*F16K 15/02* (2006.01)
*F16K 47/04* (2006.01)

(52) U.S. Cl.
CPC .......... *F16K 47/023* (2013.01); *F16K 15/026* (2013.01); *F16K 47/02* (2013.01); *F16K 47/04* (2013.01); *Y10T 137/2036* (2015.04); *Y10T 137/785* (2015.04)

(58) Field of Classification Search
CPC ........ F16K 47/02; F16K 15/02; F16K 47/023; F16K 47/04; Y10T 137/785; Y10T 137/2036
See application file for complete search history.

(56) References Cited

U.S. PATENT DOCUMENTS

| | | | | |
|---|---|---|---|---|
| 2,383,433 A | * | 8/1945 | Burnam | B05B 1/14 239/544 |
| 2,759,488 A | * | 8/1956 | Garrett | F16K 17/105 137/491 |
| 2,912,001 A | * | 11/1959 | Green | F16K 15/063 137/516.29 |
| 3,294,111 A | * | 12/1966 | Abercrombie | F16K 17/105 137/492 |
| 3,421,547 A | * | 1/1969 | Wilfred | F16K 15/044 137/539 |
| 3,542,155 A | * | 11/1970 | Price | F16N 21/02 184/105.3 |
| 3,580,275 A | * | 5/1971 | Hanson | F16K 15/026 137/516.29 |
| 3,677,001 A | * | 7/1972 | Childers | E21B 33/0355 60/398 |

(Continued)

FOREIGN PATENT DOCUMENTS

| | | |
|---|---|---|
| GB | 2509077 A | 6/2014 |
| WO | 1998/039548 A1 | 9/1998 |
| WO | 2014096795 A1 | 6/2014 |

OTHER PUBLICATIONS

PCT International Search Report/Written Opinion dated Feb. 20, 2019 for Application No. PCT/US2018/059405.

*Primary Examiner* — Marina A Tietjen
*Assistant Examiner* — Frederick D Soski
(74) *Attorney, Agent, or Firm* — Patterson + Sheridan, LLP

(57) ABSTRACT

A flow control assembly for subsea applications comprises a valve assembly and a damper assembly configured to control fluid flow between an external region and the valve assembly. The damper assembly comprises a damper housing, a damper flowpath extending between the inlet and the outlet of the damper housing, and a flow restrictor apparatus disposed in the damper flowpath to control a damper coefficient of the damper assembly.

16 Claims, 13 Drawing Sheets

(56) References Cited

U.S. PATENT DOCUMENTS

| | | | | |
|---|---|---|---|---|
| 3,725,990 A * | 4/1973 | Petersen | B21D 22/26 | |
| | | | 29/890.122 | |
| 3,746,038 A * | 7/1973 | Simmons | F02C 7/228 | |
| | | | 137/513.5 | |
| 3,782,412 A * | 1/1974 | Darash | F16K 17/0433 | |
| | | | 137/514 | |
| 3,896,844 A | 7/1975 | Schumacher | | |
| 3,987,708 A * | 10/1976 | Uhrich | B63C 11/52 | |
| | | | 92/134 | |
| 4,039,270 A * | 8/1977 | Hiraga | F04B 39/1073 | |
| | | | 417/569 | |
| 4,128,108 A | 12/1978 | Parker et al. | | |
| 4,172,466 A * | 10/1979 | Pattarini | F16K 31/383 | |
| | | | 137/488 | |
| 4,229,832 A * | 10/1980 | Dickson, Sr. | A62B 18/10 | |
| | | | 128/201.28 | |
| 4,365,648 A * | 12/1982 | Grothe | F16K 15/044 | |
| | | | 137/539 | |
| 4,537,360 A * | 8/1985 | Bock | B05B 1/14 | |
| | | | 239/553.3 | |
| 4,675,003 A * | 6/1987 | Hooven | A61M 27/006 | |
| | | | 137/539 | |
| 4,736,768 A * | 4/1988 | Tsubouchi | B60T 11/232 | |
| | | | 137/493.3 | |
| 6,244,295 B1 * | 6/2001 | Bartussek | B60T 8/341 | |
| | | | 137/539 | |
| 6,514,055 B1 * | 2/2003 | Schuller | B60T 8/4031 | |
| | | | 417/460 | |
| 6,550,698 B2 * | 4/2003 | Ness | F01P 3/08 | |
| | | | 239/132 | |
| 6,805,157 B2 * | 10/2004 | Nakazawa | B60T 8/341 | |
| | | | 137/454.4 | |
| 6,910,494 B2 * | 6/2005 | Warsakis | F16B 4/004 | |
| | | | 137/15.18 | |
| 8,602,109 B2 * | 12/2013 | Gustafson | E21B 33/0355 | |
| | | | 166/373 | |
| 9,097,267 B2 * | 8/2015 | Eide | E21B 33/0355 | |
| 10,288,182 B2 * | 5/2019 | Thompson | F16K 17/048 | |
| 2003/0037544 A1 * | 2/2003 | Armstrong | E21B 33/0355 | |
| | | | 60/413 | |
| 2013/0008715 A1 | 1/2013 | Arteaga | | |
| 2015/0322743 A1 * | 11/2015 | Thompson | E21B 33/038 | |
| | | | 166/75.11 | |
| 2016/0003714 A1 * | 1/2016 | Meikle | G01N 1/2226 | |
| | | | 73/864.73 | |
| 2017/0016566 A1 * | 1/2017 | Karppinen | F16F 9/348 | |
| 2018/0055086 A1 * | 3/2018 | Cizio | A23P 30/20 | |

* cited by examiner

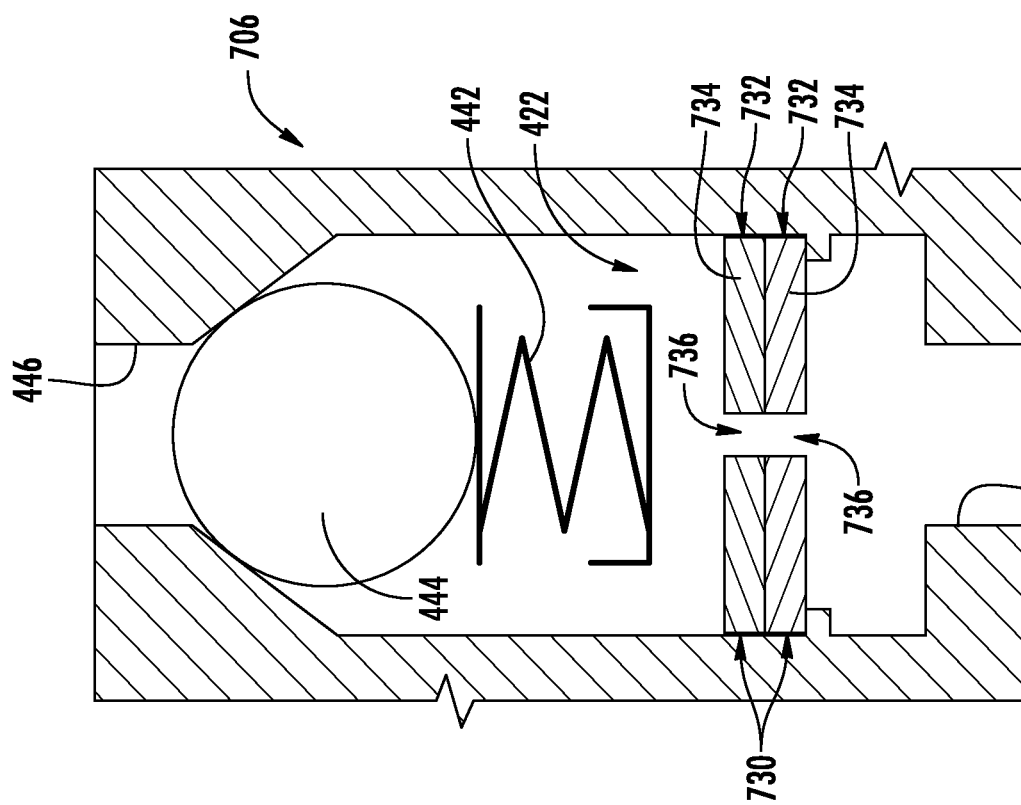
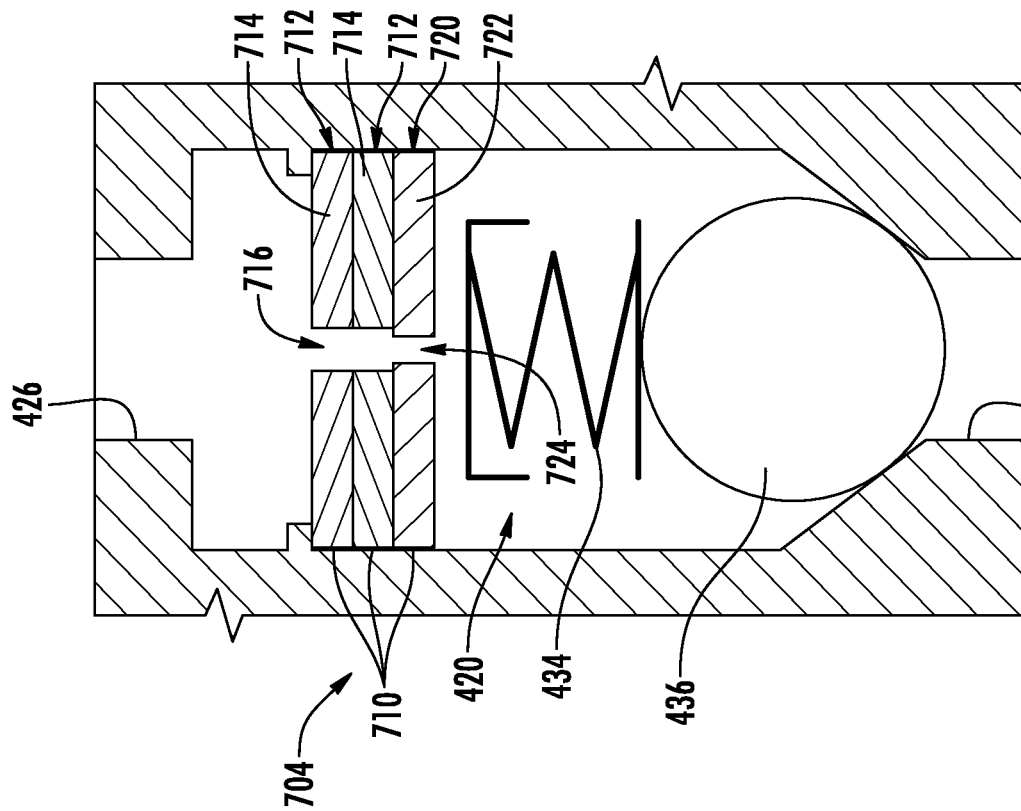
FIG. 10A
FIG. 10B

FLOW CONTROL ASSEMBLY FOR SUBSEA APPLICATIONS

BACKGROUND

Field

Embodiments described herein relate generally to flow control apparatuses for subsea applications that use a valve assembly having a damper assembly.

Description of the Related Art

Often, hydrocarbons, such as oil and gas, are deposited in rock formations located beneath the seabed. Thus, in order to explore and produce the hydrocarbons, wellbores, associated ancillary equipment, and pipelines have to be installed subsea. The wellbore and ancillary equipment, such as seabed pipelines and pigging equipment (Pipeline Inspection Gauge), generally require the use of high-pressure lines/hoses, couplings and valves, in order to manage fluid flow (e.g. hydrocarbons, drilling fluids etc.) between the reservoir and/or subsea production facilities. The extreme deep-sea pressures the equipment may be exposed to during deepwater operations can pose considerable challenges to developers and engineers alike.

Flow control assemblies are used for subsea applications and need to operate in the extreme deep-sea pressures. The flow control assemblies can include stab connectors incorporating a valve assembly configured to control fluid flow through the stab connector although are commonly used in a standalone configuration. In order to allow fluid flow into the pipeline, the internal hose pressure needs to be raised beyond the predetermined cracking pressure causing the valve assembly to open. After the valve assembly opens, pressure fluctuations may cause a valve member in the valve assembly to oscillate rapidly within a valve housing of the valve assembly. Excessive oscillations of the valve member are undesirable and may cause wear on the valve assembly.

There is a need for an improved valve assembly that significantly reduces these oscillations.

SUMMARY

In one embodiment, a flow control assembly for subsea applications comprises a valve comprising a valve housing having a flowpath extending from an inlet to an outlet of the valve housing; a valve member movable between a first position and a second position in the flowpath; and a damper interface flowpath disposed in the valve housing; and a damper assembly configured to control fluid flow between an external region and the valve, the damper assembly comprising a damper housing having an inlet in fluid communication with the damper interface flowpath of the valve housing and an outlet in fluid communication with the external region; a damper flowpath extending between the inlet and the outlet of the damper housing; and a flow restrictor apparatus disposed in the damper flowpath to control a damper coefficient of the damper assembly.

In one embodiment, a flow control assembly for subsea applications comprises a valve housing having an inlet port and an outlet port forming a valve flowpath through the valve housing; a valve member movable within the valve flowpath between a first position and a second position; a valve biasing member configured to urge the valve member towards the first position; and a damper interface flowpath disposed in the valve housing; and a damper assembly comprising a damper housing having an inlet in fluid communication with the damper interface flowpath and an outlet in fluid communication with an external region; a damper flowpath extending between the inlet and the outlet of the damper housing; and a damper valve assembly disposed in the damper housing and comprising a first damper check valve having a first damper valve flowpath, wherein the first damper check valve is positionable between an outflow unchecked position and an inflow checked position; a second damper check valve having a second damper valve flowpath, wherein the second damper check valve is positionable between an outflow checked position and an inflow unchecked position, and wherein the damper flowpath includes the first damper valve flowpath and the second damper valve flowpath; and a flow restrictor apparatus disposed in the damper flowpath to control a damper coefficient of the damper assembly.

BRIEF DESCRIPTION OF THE DRAWINGS

So that the manner in which the above recited features of the present disclosure can be understood in detail, a more particular description of the disclosure, briefly summarized above, may be had by reference to implementations, some of which are illustrated in the appended drawings. It is to be noted, however, that the appended drawings illustrate only selected implementations of this disclosure and are therefore not to be considered limiting of its scope, for the disclosure may admit to other equally effective implementations.

FIG. 10A depicts a first damper check valve according to one embodiment.

FIG. 10B depicts a second damper check valve according to one embodiment.

To facilitate understanding, identical reference numerals have been used, wherever possible, to designate identical elements that are common to the Figures Additionally, elements of one implementation may be advantageously adapted for utilization in other implementations described herein.

DETAILED DESCRIPTION

Embodiments herein generally provide a flow control assembly that includes a valve assembly in fluid communication with a damper assembly. The flow control assembly may be coupled to a hose that extends from a surface vessel to a pipeline on a seabed. The valve assembly with the damper assembly controls fluid flow through the hose and the pipeline.

In one embodiment, the valve assembly may be in the form of a check valve assembly, and moves from a closed position to an open position when fluid from the hose provides an opposing force on a valve member of the valve assembly that exceeds a check valve cracking pressure. The valve assembly has a damper interface flowpath that is adapted to operatively link a pressure interface surface of the valve member to an external fluid in an external region of the flow control assembly. The damper assembly includes a damper flowpath in fluid communication with both the damper interface flowpath of the valve assembly and the external region of the flow control assembly. Together the damper interface flowpath and the damper flowpath form a pressure interface flowpath between the valve member and the external region of the flow control assembly. The damper assembly includes a damper valve assembly disposed in the damper flowpath.

The flow control assembly reduces the undesirable oscillations of the valve member that may occur during a time period after the valve assembly first moves from the closed position to the open position. Undesirable oscillations of the valve member may include rapid opening and closing of the valve assembly and may be referred to as chattering or fluttering of the valve assembly.

Figure 1:
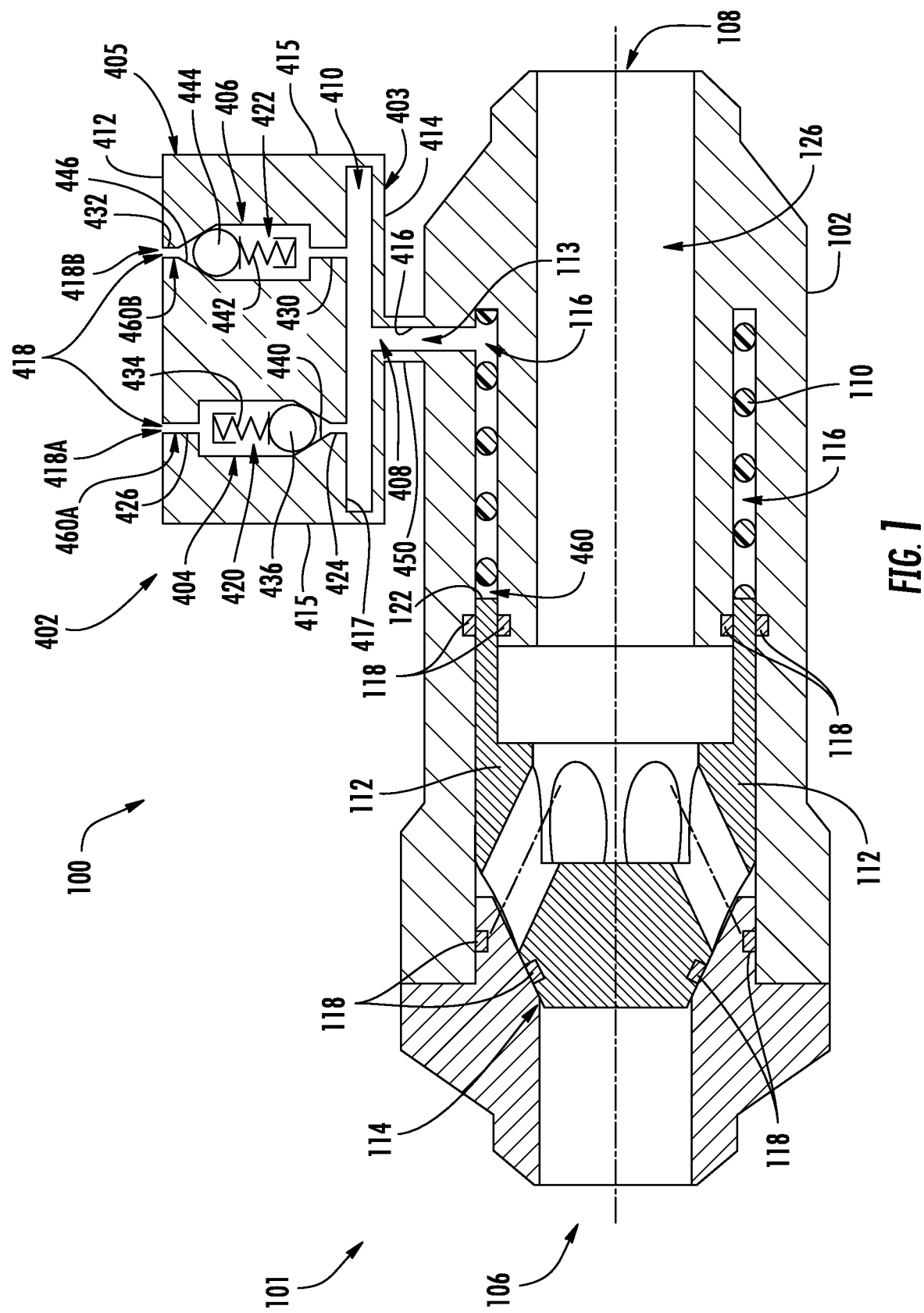
FIG. 1 depicts a flow control assembly according to one embodiment.

FIG. 1 depicts a flow control assembly 100 including a valve assembly 101 coupled to a damper assembly 402. The valve assembly 101, shown in FIG. 1, is in the form of a check valve. The valve assembly 101 may also be other types of valves that include a valve member 112 that is movable in a valve flowpath 126 between a first position and a second position. The valve member 112 is in an upstream position when in the first position, and the valve member 112 is in a downstream position in the valve flowpath 126 when in the second position. In some embodiments, the first position of the valve member 112 is in a closed position where fluid flow through the valve flowpath 126 is closed with the valve member 112 forming a seal in the valve flowpath 126, and the second position of the valve member 112 is in an open position where fluid flows through the valve flowpath 126. In other embodiments, the first position of the valve member 112 is in an open first position where fluid flows through the valve flowpath 126 and the valve member 112 is in an upstream position, and a closed second position where fluid is blocked through the valve flowpath 126 and the valve member 112 is in a downstream position.

In the embodiment shown in FIG. 1, the valve assembly 101 has a valve housing 102 having a valve inlet port 106 and a valve outlet port 108 forming a valve flowpath 126, a valve biasing member 110 in the form of a compression spring, a valve member 112, and a valve seat surface 114. The valve assembly 101 includes a damper interface flowpath 116. The damper interface flowpath 116 links an ambient pressure provided by an external fluid of an external region of the valve assembly 101 with a pressure interface surface 122 of the valve member 112.

A valve housing opening 113 extends through the valve housing 102. The damper interface flowpath 116 extends from the pressure interface surface 122 of the valve member 112 to the valve housing opening 113. Sealing members 118 are arranged between the valve housing 102 and valve member 112 so as to fluidly seal the valve flowpath 126 when the valve member 112 is in its closed position, and to fluidly seal the valve flowpath 126 from the damper interface flowpath 116 linking the valve member 112 with the pressure provided by the external fluid, independent of the position of the valve member 112.

The damper interface flowpath 116 is disposed in the valve housing 102. The damper interface flowpath 116 is adapted to operatively link the valve member 112 and an external fluid of a region exterior of the flow control assembly 100 so as to provide a supplemental force, proportional to an ambient pressure of the external fluid, adapted to urge the valve member 112 towards the closed position and upstream.

The damper assembly 402 is in fluid communication with the damper interface flowpath 116 of the valve assembly 101. The damper assembly 402 has a damper housing 403 and a damper valve assembly 405 disposed in the damper housing 403. A damper flowpath 408 extends between a damper assembly inlet 416 and a damper assembly outlet 418 of the damper assembly 402. The damper flowpath 408 is in fluid communication with the damper interface flowpath 116 of the valve assembly 101. Together the damper interface flowpath 116 and the damper flowpath 408 form a pressure interface flowpath 460 between the valve member 112 and the external region of the flow control assembly 100.

The damper housing 403 has a damper outlet wall 412, a damper inlet wall 414, and a damper side wall 415. The damper side wall 415 may have a cylindrical shape. The damper assembly inlet 416 is disposed in and extends through the damper inlet wall 414. The damper assembly outlet 418 is formed by a first damper assembly outlet 418A and a second damper assembly outlet 418B, and is disposed in and extends through the damper outlet wall 412.

The damper valve assembly 405 includes a damper chamber wall 417 disposed in the interior of the damper housing 403 and connected to the damper side wall 415. In the embodiment of FIG. 1, the damper valve assembly 405 extends from the damper chamber wall 417 to the damper outlet wall 412. The damper valve assembly 405 has a first damper valve flowpath 420 and a second damper valve flowpath 422 extending through the damper valve assembly 405. The first damper valve flowpath 420 extends from a first damper valve inlet 424 to a first damper valve outlet 426. The second damper valve flowpath 422 extends from a second damper valve inlet 430 to a second damper valve outlet 432.

The first damper valve assembly 404 and the second damper valve assembly 406 are configured to have a first damper valve flowpath 420 and a second damper valve flowpath 422 that is restricted. Restricting the flowpath through the damper assembly 402 helps reduce or dampen the movement of the valve member 112 for pressure fluctuations in the valve flowpath 126. In some embodiments, the first damper valve assembly 404 and the second damper valve assembly 406 may be adjustable to selectively control the amount of restriction for each of the first damper valve flowpath 420 and the second damper valve flowpath 422. For example, the first damper valve assembly 404 and the second damper valve assembly 406 each may have a flow restrictor apparatus for selectively restricting the first damper valve flowpath 420 and the second damper valve flowpath 422, respectively. One embodiment of the flow restrictor apparatus that may be used in the first damper valve assembly 404 and the second damper valve assembly 406 is disclosed in FIG. 10A and FIG. 10B, and is further discussed below.

A damper fluid chamber 410 is formed between the damper chamber wall 417 and the damper inlet wall 414. The first damper valve inlet 424 and the second damper valve inlet 430 are coupled to the damper fluid chamber 410 and extend through the damper chamber wall 417. The damper fluid chamber 410 is coupled to the valve housing opening 113 and damper interface flowpath 116 by the damper assembly inlet 416. The damper flowpath 408 includes damper fluid chamber 410, the first damper valve flowpath 420, and the second damper valve flowpath 422.

A damper housing connector 450 connects the damper housing 403 to the valve housing 102. The damper housing connector 450 may include bolts, other connectors, and sealing members (not shown). In the embodiment shown in FIG. 1, the damper assembly inlet 416 and damper housing 403 are integrally formed together.

A first damper check valve 404 is disposed in the first damper valve flowpath 420 and a second damper check valve 406 is disposed in the second damper valve flowpath 422 to control fluid flow through the damper valve assembly 405. The first damper check valve 404 includes a first damper valve member 436, a first damper biasing member 434, and a first damper valve seal surface 440. The second damper check valve 406 includes a second damper valve member 444, a second damper biasing member 442, and a second damper valve seal surface 446.

The first damper valve member 436 is disposed in the first damper valve flowpath 420. The first damper check valve 404 is movable between an outflow unchecked position and an inflow checked position. The first damper biasing member 434 is adapted to urge the first damper valve member 436 in the inflow checked position at a first damper biasing force $F_{d1}$. The first damper biasing force $F_{d1}$ may be a spring force and may be a constant force that urges the first damper valve member 436 towards the inflow checked position.

The second damper valve member 444 is disposed in the second damper valve flowpath 422. The second damper check valve 406 is movable between an outflow checked position and an inflow unchecked position. The second damper check valve 406 has a second damper biasing member 442 adapted to urge the second damper valve member 444 in the outflow checked position at a second damper biasing force $F_{d2}$. The second damper biasing force $F_{d2}$ may be a spring force and may be a constant force. The second damper biasing force $F_{d2}$ of second damper biasing member 442 may equal the first damper biasing force $F_{d1}$ of first damper biasing member 434 in some embodiments. In other embodiments, the second damper biasing force $F_{d2}$ of second damper biasing member 442 may not equal the first damper biasing force $F_{d1}$ of first damper biasing member 434.

A pressure interface flowpath 460 extends between the pressure interface surface 122 of the valve member 112 and the damper assembly outlet 418. For the embodiment shown in FIGS. 1-4, the pressure interface flowpath 460 includes the damper interface flowpath 116 and the damper flowpath 408. The pressure interface flowpath 460 forms a pressure interface between the external fluid disposed in the external region of the flow control assembly 100 and the pressure interface surface 122 of the valve member 112.

Figure 2:
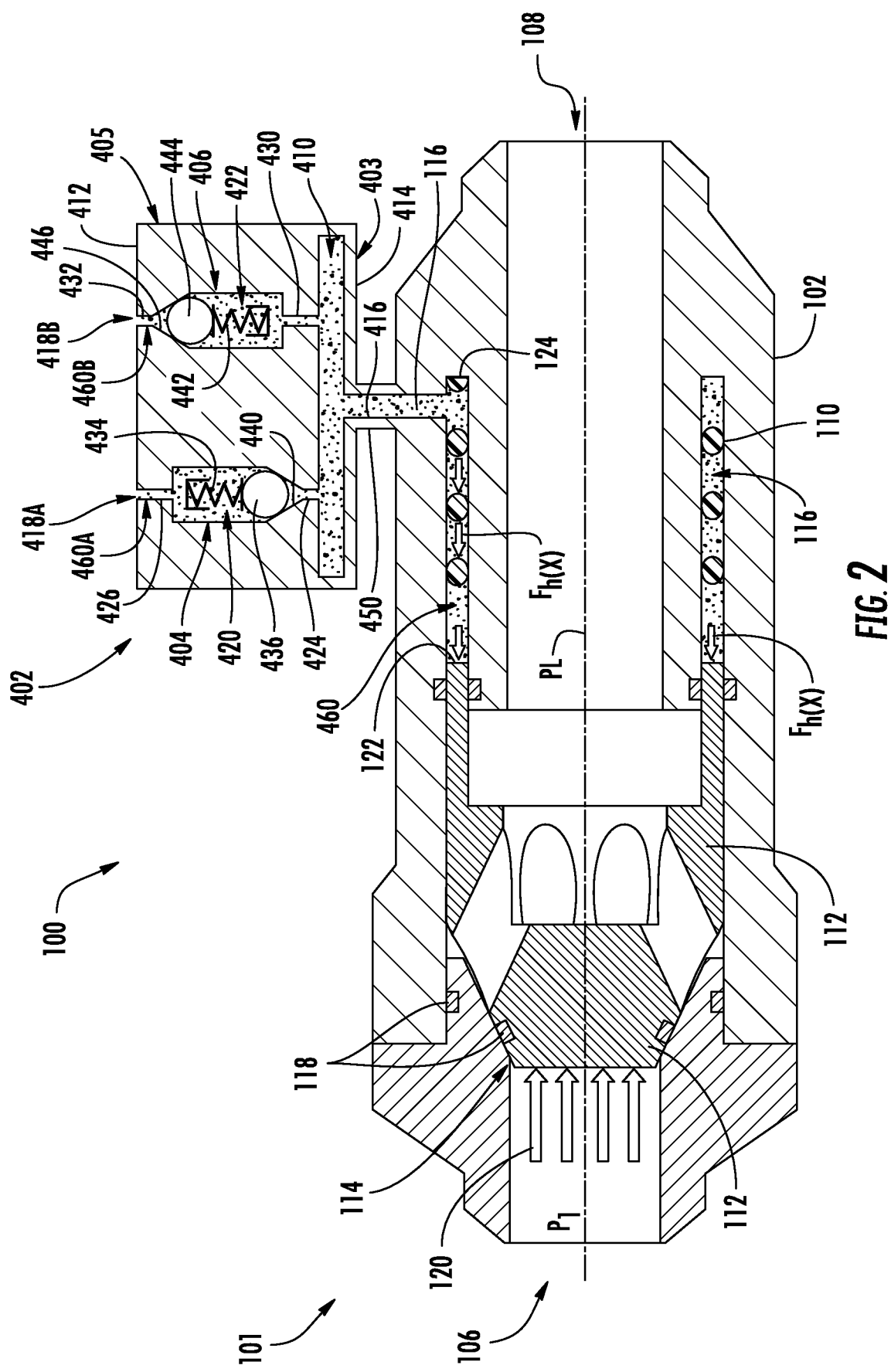
FIG. 2 depicts a functional diagram of the flow control assembly of FIG. 1 with the check valve in a closed position and the damper assembly in a closed damper position.

FIG. 2 shows the flow control assembly 100 with a hose fluid depicted by arrows 120 pressing against an upstream surface of the valve member 112 with an internal hose pressure $P_1$ that is provided by hydrostatic pressure and a pump (not shown). A valve biasing force, such as a spring force $F_s$ provided by a valve biasing member 110 in the form of a compression spring, urges the valve member 112 towards the valve seat surface 114, so as to seal the valve flowpath 126 between the valve inlet port 106 and the valve outlet port 108. The valve biasing force $F_s$ is a constant force in some embodiments. In other embodiments, the valve biasing force $F_s$ may vary. The valve biasing member 110 is operatively arranged between a pressure interface surface 122 of the valve member 112 and an interior wall 124 of the valve housing 102.

In FIG. 2, the flow control assembly 100 is in situ with external fluid disposed in the pressure interface flowpath 460. The pressure of the external fluid in the pressure interface flowpath 460 exerts a hydrostatic pressure $P_{h-x}$ at the subsea depth X to the pressure interface surface 122 of the valve member 112. In some embodiments, the damper assembly 402 may be configured to have some leakage of external fluid past the first damper check valve 404 and the second damper check valve 406 when the damper valve assembly 405 is in the damper closed position with the first damper check valve 404 and the second damper check valve 406 in closed positions.

In some embodiments, fluid may be added to damper fluid chamber 410 and damper interface flowpath 116 before placing the flow control assembly 100 in situ for fluid control operations. For example, fluid may be added to the damper fluid chamber 410 and damper interface flowpath 116 through damper assembly outlet 418 and the first damper valve flowpath 420 or the second damper valve flowpath 422.

In FIG. 2, the damper valve assembly 405 is shown in a closed damper position. When in the closed damper position, the first damper check valve 404 is in the inflow checked position and the second damper check valve 406 is in the outflow checked position so as to block fluid flow through the damper valve assembly 405.

The pressure interface, linking the external fluid (not shown) with the valve member 112, is in a form of the pressure interface flowpath 460 disposed between the damper assembly outlet 418 and the pressure interface surface 122 of the valve member 112. In accordance with Pascal's law, the hydrostatic pressure $P_{h-x}$ at the subsea depth X is applied to the pressure interface surface 122, as depicted by arrows $F_h(x)$, through the pressure interface flowpath 460. The valve biasing member 110 of valve member 112 provides a valve biasing force $F_s$ directly to the pressure interface surface 122 of the valve member 112. The first damper biasing member 434 of damper assembly 402 provides a first damper biasing force $F_{d1}$ in the pressure interface flowpath 460. The second damper biasing member 442 of damper assembly 402 provides a second damper biasing force $F_{d2}$ in the pressure interface flowpath 460.

The hose fluid flowing through the check valve inlet port 106 is depicted by arrows 120. The hose fluid has to overcome the check valve cracking pressure $P_c(x)$ to move the valve member 112 from the closed position. When in the closed position, the valve assembly 101 blocks fluid flow between the check valve inlet 106 and the check valve outlet 108. In some embodiments, the fluid flow through valve flowpath 126 may be restricted when the valve assembly 101 is in the closed position, and fluid flow through the valve flowpath 126 is less restricted (compared to the closed position) when the valve assembly 101 is in an open position.

The cracking pressure $P_c(x)$ that the hose fluid has to overcome at the subsea depth X to move the valve member 112 from the closed position to the open position to open the valve flowpath 126 of the valve assembly 101 is determined by and proportional to the force $F_h(x)$ provided by the hydrostatic pressure $P_{h-x}$ at subsea depth X acting on the pressure interface surface 122 of the valve member 112, the valve biasing force $F_{s1}$ provided by the valve biasing member 110, and the internal pipeline pressure PL of the pipeline acting on the pressure interface surface 122 of the valve member 112. The first damper biasing force $F_{d1}$ of the first damper biasing member 434 and second damper biasing force $F_{d2}$ are significantly smaller than the valve biasing force $F_{s1}$ and are not included in the check valve cracking pressure $P_c(x)$ equation. The internal pipeline pressure PL of the pipeline may be assumed to be constant for the check valve cracking pressure $P_c(x)$ equation provided below.

$$P_c(x)=F_h(x)+F_{s1}+PL \text{ (check valve cracking pressure } P_c(x) \text{ equation)}$$

The check valve cracking pressure $P_c(x)$ that the hose fluid depicted by arrows 120 has to overcome at the subsea depth X to move the valve member 112 from the closed position to the open position is proportional the force $F_h(x)$ provided by the hydrostatic pressure $P_{h-x}$ at subsea depth X acting on the pressure interface surface 122 of the valve member 112, the valve biasing force $F_{s1}$ provided by the valve biasing member 110, and the internal pipeline pressure of the pipeline PL acting on the pressure interface surface 122.

In order to prevent hose collapse, the hose is pressurized at an internal hose pressure $PH_1$ that is directly proportional to the hydrostatic pressure $P_{h-x}$. Hence, the check valve cracking pressure $P_c(x)$ is proportional to the internal hose pressure $PH_1$ at subsea depth X, therefore, automatically providing the appropriate cracking pressure $P_c(x)$ suitable for the internal hose pressure $PH_1$ at subsea depth X. Any significant pressure drop in the hose (not shown) that reduces $PH_1$ to below $P_c(x)$, causes the valve member 112 to move back into the closed position, therefore preventing the hose to collapse. The damper assembly 402 reduces the velocity that the valve member 112 oscillates or moves back and forth in the valve housing 102 due to pressure variations in the valve flowpath 126, as discussed below.

Figure 3:
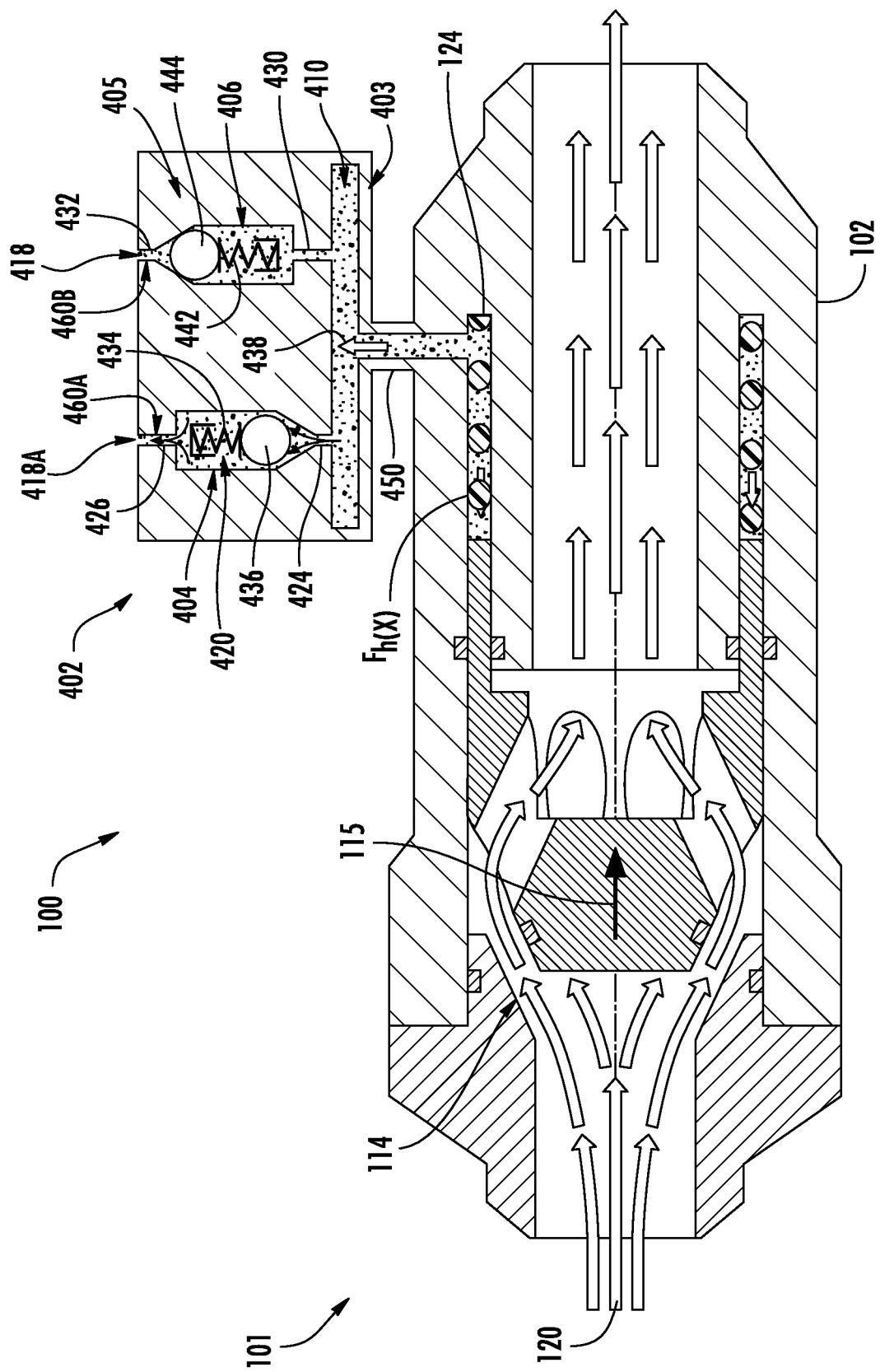
FIG. 3 depicts a functional diagram of the flow control assembly of FIG. 1 with the valve assembly in an open position and the damper assembly in an outflow damper position.

FIG. 3 depicts a functional diagram of the flow control assembly 100 of FIG. 1 when the valve assembly 101 is in a downstream movement state where the valve member 112 is moving downstream in the valve flowpath 126 with the valve assembly 101 in the open position and the damper assembly 402 in the outflow damper position. The valve member 112 moves from the closed position or upstream position, shown in FIG. 2, to the open position or downstream position, shown in FIG. 3, after the check valve cracking pressure $P_c(x)$ is exceeded by internal hose pressure $PH_1$. When the check valve cracking pressure is exceeded, the valve member 112 moves downstream, as depicted by downstream movement arrow 115, to open the valve flowpath 126 between the valve member 112 and the valve seat surface 114 to allow fluid depicted by arrows 120 to flow through the valve flowpath 126.

The pressure interface surface 122 of the valve member 112 moves to the right in the damper interface flowpath 116. As the valve member 112 moves downstream, as depicted by downstream movement arrow 115, fluid in pressure interface flowpath 460 applies an outflow force against the first damper valve member 436 of the first damper check valve 404 to move the first damper valve member 436 away from the first damper valve seat surface 440. This results in the first damper check valve 404 moving from the inflow checked position to the outflow unchecked position. A fluid outflow of fluid from the damper interface flowpath 116 and the damper fluid chamber 410 flows through the first damper valve flowpath 420, through the first damper valve outlet 426, and out of the first damper assembly outlet 418A to the external region, as depicted by flow arrows 438. As the valve member 112 moves downstream, as depicted by downstream movement arrow 115, the second damper check valve 406 remains in the outflow checked position, and the damper assembly 402 is in the outflow damper position. When the valve member 112 is moved towards the open position, the first damper check valve 404 is moved to the outflow unchecked position.

When the damper assembly 402 is in the outflow damper position, as shown in FIG. 3, the pressure interface flowpath 460 includes first damper valve flowpath 420 through the first damper check valve 404, and the second damper check valve 406 is closed to fluid flow. The pressure interface flowpath 460 may be referred to as an outflow pressure interface flowpath 460A when the damper assembly 402 is in the outflow damper position. The outflow pressure interface flowpath 460A forms a pressure interface between the external fluid disposed in the external region of the flow control assembly 100 and the pressure interface surface 122 of the valve member 112. The valve assembly 101 remains in the downstream movement state with the valve assembly 101 in the open position and the damper assembly 402 in the outflow damper position, as shown in FIG. 3, while the valve member 112 is moving downstream in the valve flowpath 126. When the damper assembly 402 is in the outflow damper position, the second damper check valve 406 blocks the outflow of fluid, and the first damper check valve 404 allows the outflow of fluid.

The first damper valve assembly 404 is configured to have a restricted flowpath so that the fluid outflow rate from the damper interface flowpath 116 of the valve assembly 101 through the damper assembly 402 is restricted. Restricting the flowpath through the damper assembly 402 helps reduce the movement of the valve member 112. A reduced flow rate through the first damper valve flowpath 420 helps reduce or dampen the movement of the valve member 112 for pressure fluctuations in the valve flowpath 126.

The reduced rate of movement of the valve member 112 due to the restricted flowrate through the outflow pressure interface flowpath 460A minimizes the distance that the valve member 112 moves downstream over a specific time. The first damper valve assembly 404 has a first damping coefficient that limits the movement of the valve member 112 downstream over a specific time. The restriction of the flow through the first damper valve flowpath 420 may be increased, for example by decreasing the flowpath area in the first damper valve flowpath 420. Increasing the flow restriction increases the first damping coefficient of the first damper valve assembly 404.

The damping coefficient for the first damper check valve 404 also may be adjusted by choosing a damper biasing member 434 to have a selected damper biasing force $F_{d1}$. For example, as the first damper biasing force $F_{d1}$ is increased the damping coefficient for the first damper check valve 404 is increased, and the movement of the valve member 112 over a specific time is reduced.

Figure 4:
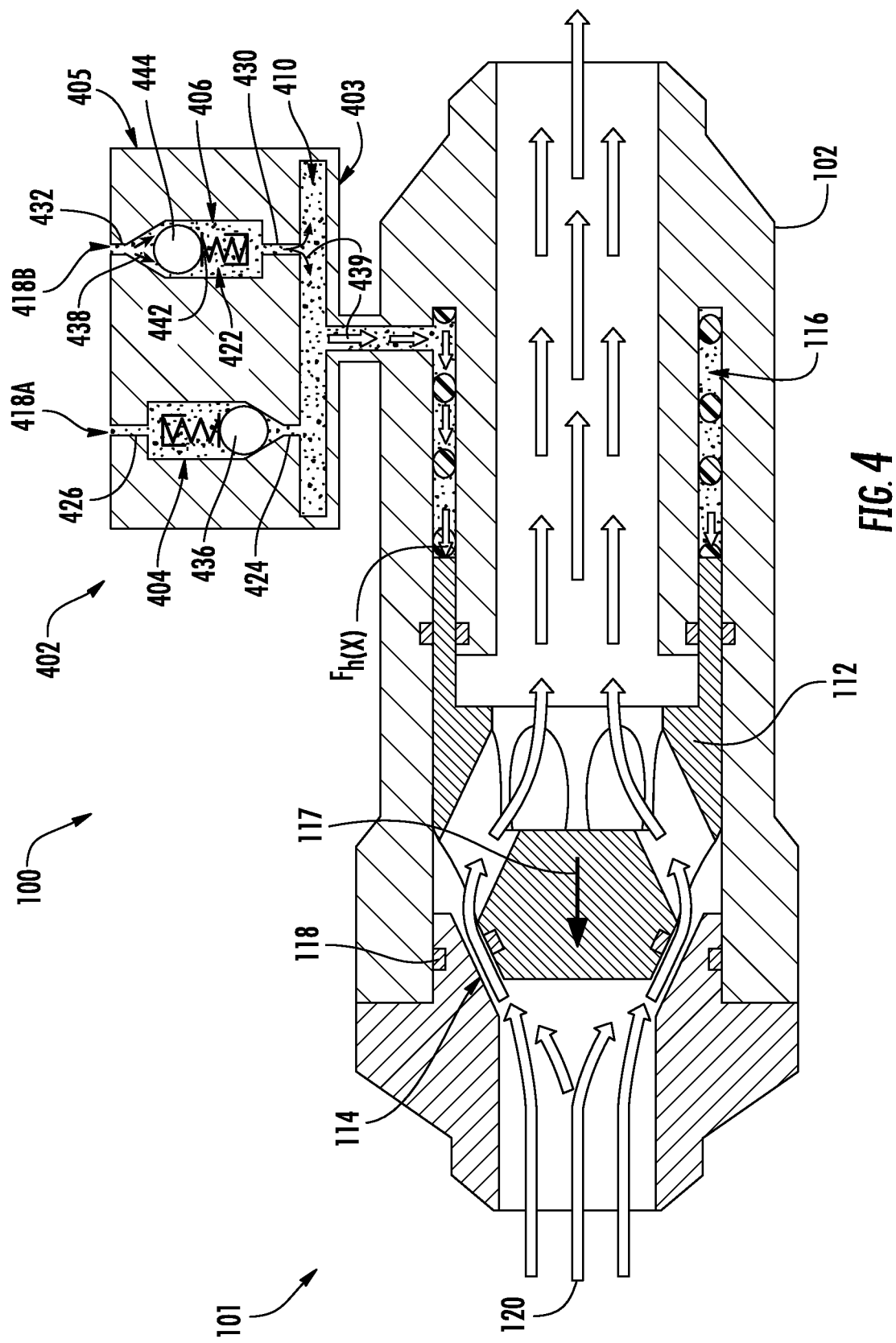
FIG. 4 depicts a functional diagram of the flow control assembly of FIG. 1 with the valve assembly in an open position and the damper assembly in an inflow damper position.

FIG. 4 depicts a functional diagram of the flow control assembly 100 of FIG. 1 when the valve assembly 101 is in an upstream movement state where the valve member 112 is moving upstream in the valve flowpath 126, as depicted by upstream movement arrow 117. The valve assembly 101 is in the open position and the damper assembly 402 in an inflow damper position. The valve member 112 moves from the open position, shown in FIG. 4, upstream and towards the closed position, shown in FIG. 2. A fluid pressure fluctuation in the valve flowpath 126 causes the valve member 112 to move upstream, as depicted by upstream movement arrow 117 in FIG. 4. When the valve member 112 is moved towards the closed position, the second damper check valve 406 is moved to the inflow unchecked position.

The pressure interface surface 122 of the valve member 112 moves to the left in the damper interface flowpath 116, as shown in FIG. 4. As the valve member 112 moves upstream, as depicted by upstream movement arrow 117, the external fluid applies an inflow force against the second damper valve member 444 of the second damper check valve 406 to move the second damper valve member 444 away from the second damper valve seal surface 446. This results in the second damper check valve 406 moving from the outflow checked position to the inflow unchecked position. A fluid inflow from the external region flows through the second damper valve flowpath 422, as shown by flow arrows 438, and to the damper interface flowpath 116, as depicted by flow arrows 439. The fluid inflow of external fluid moves the valve member 112 upstream and towards the closed position. As the valve member 112 moves upstream, as depicted by upstream movement arrow 117, the first damper check valve 404 is in the inflow checked position and the damper assembly 402 is in the inflow damper position.

When the damper assembly 402 is in the inflow damper position, as shown in FIG. 4, the pressure interface flowpath 460 includes the second damper valve flowpath 422 through the second damper check valve 406, and the first damper check valve 404 is closed to fluid flow. The pressure interface flowpath 460 may be referred to as an inflow pressure interface flowpath 460B when the damper assembly 402 is in the inflow damper position. The inflow pressure interface flowpath 460B forms a pressure interface between the external fluid disposed in the external region of the flow control assembly 100 and the pressure interface surface 122 of the valve member 112. The valve assembly 101 remains in the upstream movement state with the valve assembly 101 in the open position and the damper assembly 402 in the inflow damper position, as shown in FIG. 4, while the valve member 112 is moving upstream in the valve flowpath 126. When the damper assembly 402 is in the inflow damper position, the first damper check valve 404 blocks the inflow of fluid, and the second damper check valve 406 allows the inflow of fluid.

The second damper check valve 406 is configured to have a restricted flowpath so that the fluid inflow rate from the external region through the second damper assembly outlet 418B and through the second damper valve flowpath 422 is restricted. Restricting the flowpath through the damper assembly 402 helps reduce the upstream movement of the valve member 112. A reduced flow rate through the second damper valve flowpath 422 helps reduce the movement of the valve member 112. A reduced flow rate through the second damper valve flowpath 422 helps reduce or dampen the movement of the valve member 112 for pressure fluctuations in the valve flowpath 126.

The reduced rate of movement of the valve member 112 due to the restricted flowrate through the inflow pressure interface flowpath 460B minimizes the distance that the valve member 112 moves upstream over a specific time. The second damper check valve 406 has a second damping coefficient that limits the movement of the valve member 112 downstream over a specific time. The restriction of the flow through the second damper valve flowpath 422 may be increased, for example by decreasing the flowpath area in the second damper valve flowpath 422. Increasing the flow restriction increases the second damping coefficient of the second damper check valve 406.

The damping coefficient for the second damper check valve 406 also may be adjusted by choosing a damper biasing member 442 to have a selected second damper biasing force $F_{d2}$. For example, as the second damper biasing force $F_{d2}$ is increased the damping coefficient for the second damper check valve 406 is increased, and the movement of the valve member 112 over a specific time is reduced.

Figure 5:
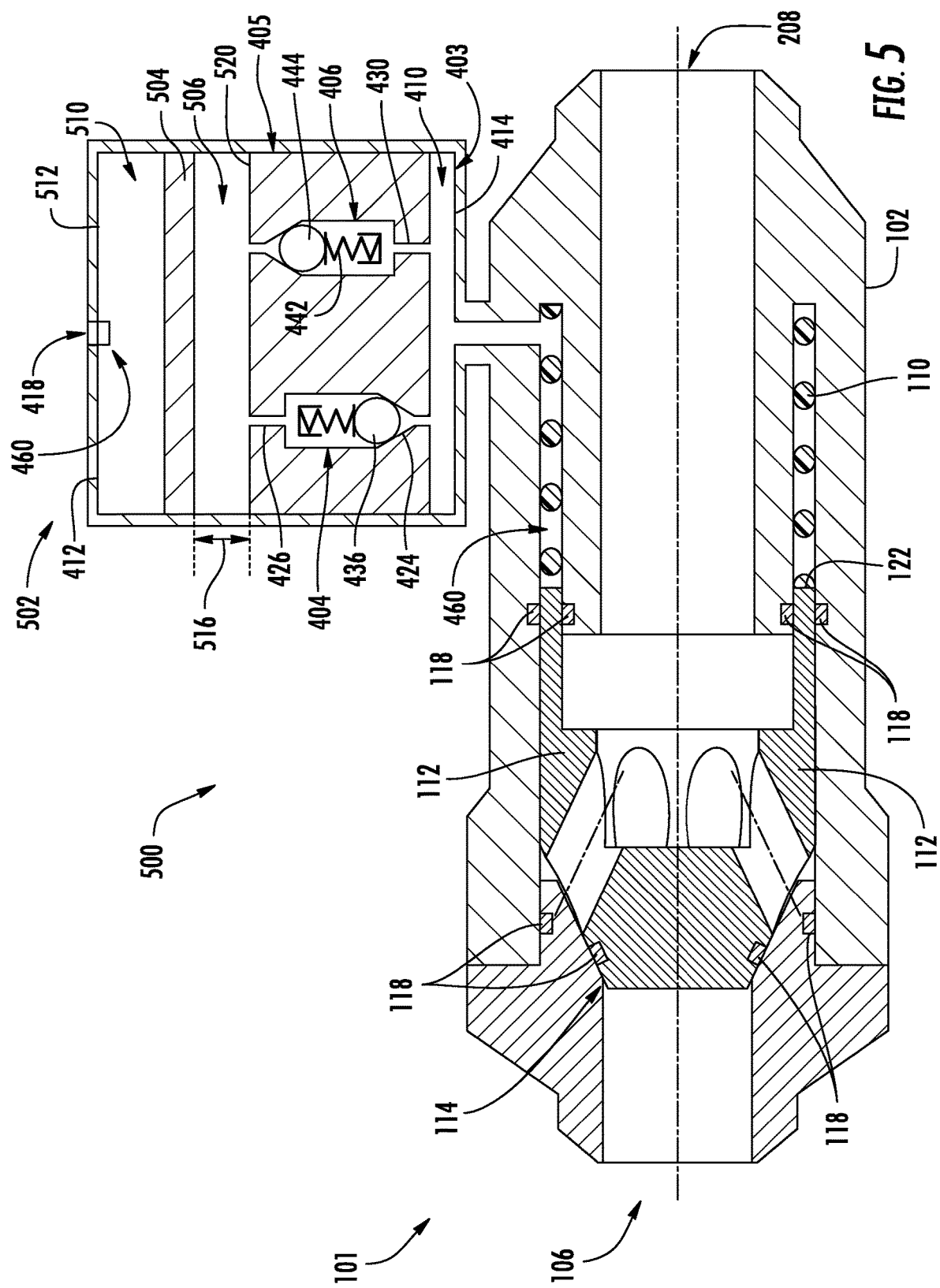
FIG. 5 depicts a flow control assembly with the valve assembly of FIG. 1 and a damper assembly according to one embodiment.

FIG. 5 depicts a flow control assembly 500 with the valve assembly 101 of FIG. 1 and a damper assembly 502 according to one embodiment. The valve assembly 101 is the same as shown and discussed with respect to FIGS. 1-4. The damper assembly 502 has certain components that were described with respect to the damper assembly 402 and these components are numbered with the same reference numbers as used with respect to damper assembly 402. The damper assembly 502 includes a damper piston 504 and a damper outlet wall 512 disposed in the damper housing 403. The damper valve assembly 405 includes a damper valve outlet wall 520. The damper piston 504 is disposed between the damper valve outlet wall 520 and the damper outlet wall 512.

A working fluid chamber 506 is disposed between the damper piston 504 and damper valve outlet wall 520 of the damper valve assembly 405. The damper assembly 502 includes the damper piston 504 in the pressure interface flowpath 460. Specifically, the damper piston 504 is disposed in the damper housing 403 and separates the damper flowpath 408 to separate a working fluid in the working fluid chamber 506 on one side and the external fluid in an external fluid outlet chamber 510 on the opposite side. More specifically, the working fluid chamber 506 is formed between the damper valve outlet wall 520 and the damper piston 504. The working fluid chamber 506 is adapted to contain the working fluid. The working fluid may be oil or water in a liquid state.

The external fluid outlet chamber 510 is formed between the damper piston 504 and the damper outlet wall 512. The damper outlet wall 512 has a damper assembly outlet 418 extending through the damper outlet wall 512 so as to allow external fluid to flow between the external region and the external fluid outlet chamber 510. The damper piston 504 separates the working fluid chamber 506 from the external fluid outlet chamber 510, and accordingly, the working fluid from the external fluid. The damper piston 504 operatively links the valve member 112 to the external fluid of the external region through the working fluid.

The damper piston 504 is movable within the damper housing 403, as depicted by arrow 516. For example, the valve member 112 moving from the closed position to the open position would cause a fluid outflow of working fluid through the first damper valve flowpath 420 to the working fluid chamber 506. The flow of working fluid into the working fluid chamber 506 would provide a force against a bottom of the damper piston 504 so as to force the damper piston 504 upwards to increase the volume in the working fluid chamber 506. In one embodiment, the damper piston 504 is a floating piston. When the valve member 112 moves upstream from the open position towards the closed position, the damper piston 504 will move downwardly with the working fluid flowing from the working fluid chamber 506 through the second damper valve flowpath 422, into the damper fluid chamber 410, and into the damper interface flowpath 116.

The pressure interface flowpath 460 extends from the damper assembly outlet 418 to the pressure interface surface 122, and includes the external fluid outlet chamber 510, the working fluid chamber 506, the first damper valve flowpath 420, the second damper valve flowpath 422, the damper fluid chamber 410, and the damper interface flowpath 116. The pressure interface flowpath 460 forms a pressure interface between the external fluid and the pressure interface surface 122 of the valve member 112. The damper piston 504 operatively links the valve member 112 to the external fluid of the external region through the working fluid.

The pressure interface flowpath 460 of the damper assembly 502 operatively links the valve member 112 to the external fluid in the external region as discussed with respect to the pressure interface flowpath 460 of the damper assembly 402 of FIGS. 1-4 with the exception that the working fluid isolates the external fluid so that the external fluid does not directly flow through the damper valve assembly 405, the damper fluid chamber 410 and the damper interface flowpath 116. By isolating the external fluid in this manner, the working fluid flowing through the damper valve assembly 405 and the damper interface flowpath 116 can be selected to limit contaminants flowing through a portion of the pressure interface flowpath 460 located below the damper piston 504.

Figure 6:
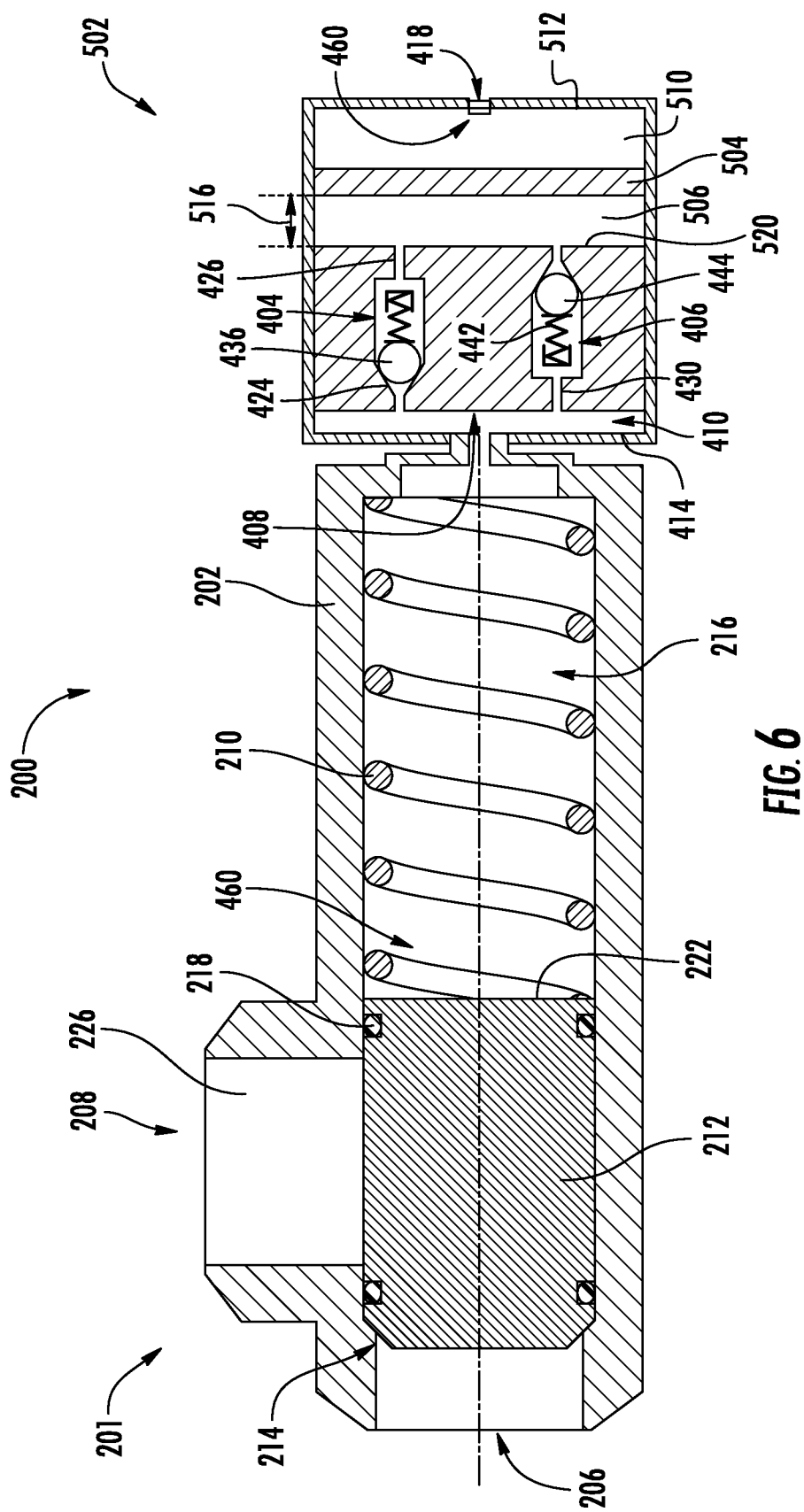
FIG. 6 depicts a flow control assembly according to one embodiment including the damper assembly of FIG. 5.

FIG. 6 depicts a flow control assembly 200 including the damper assembly 502 of FIG. 5 coupled to a valve assembly 201, according to one embodiment. The valve assembly 201 includes a valve housing 202, a valve inlet port 206, a valve outlet port 208, a valve biasing member 210 in form of a compression spring, a valve member 212, a valve seat surface 214, a damper interface flowpath 216, sealing members 218 and a pressure interface surface 222.

The valve inlet port 206 and valve outlet port 208 of the valve assembly 201 are arranged perpendicular to each other. The damper interface flowpath 216 is arranged in line with the valve inlet port 206 so that the valve member 212 can move between a closed position, where the fluid flow between valve inlet port 206 and valve outlet port 208 is blocked, and an open position, where fluid flow between the valve inlet port 206 and the valve outlet port 208 is unblocked.

Figure 7:
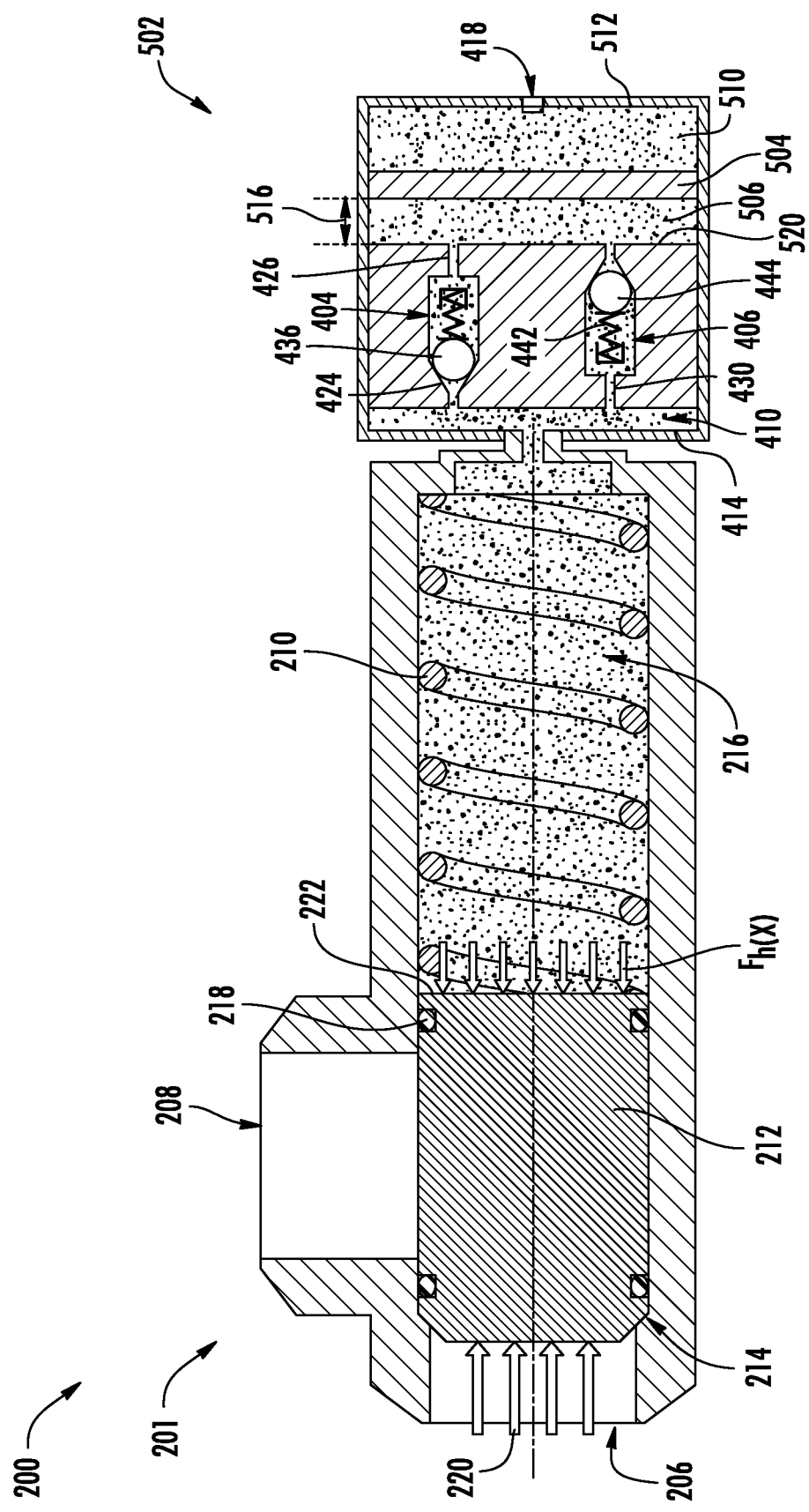
FIG. 7 depicts a functional diagram of the flow control assembly of FIG. 6 with the valve assembly in a closed valve position and the damper assembly in a closed damper position.
Figure 8:
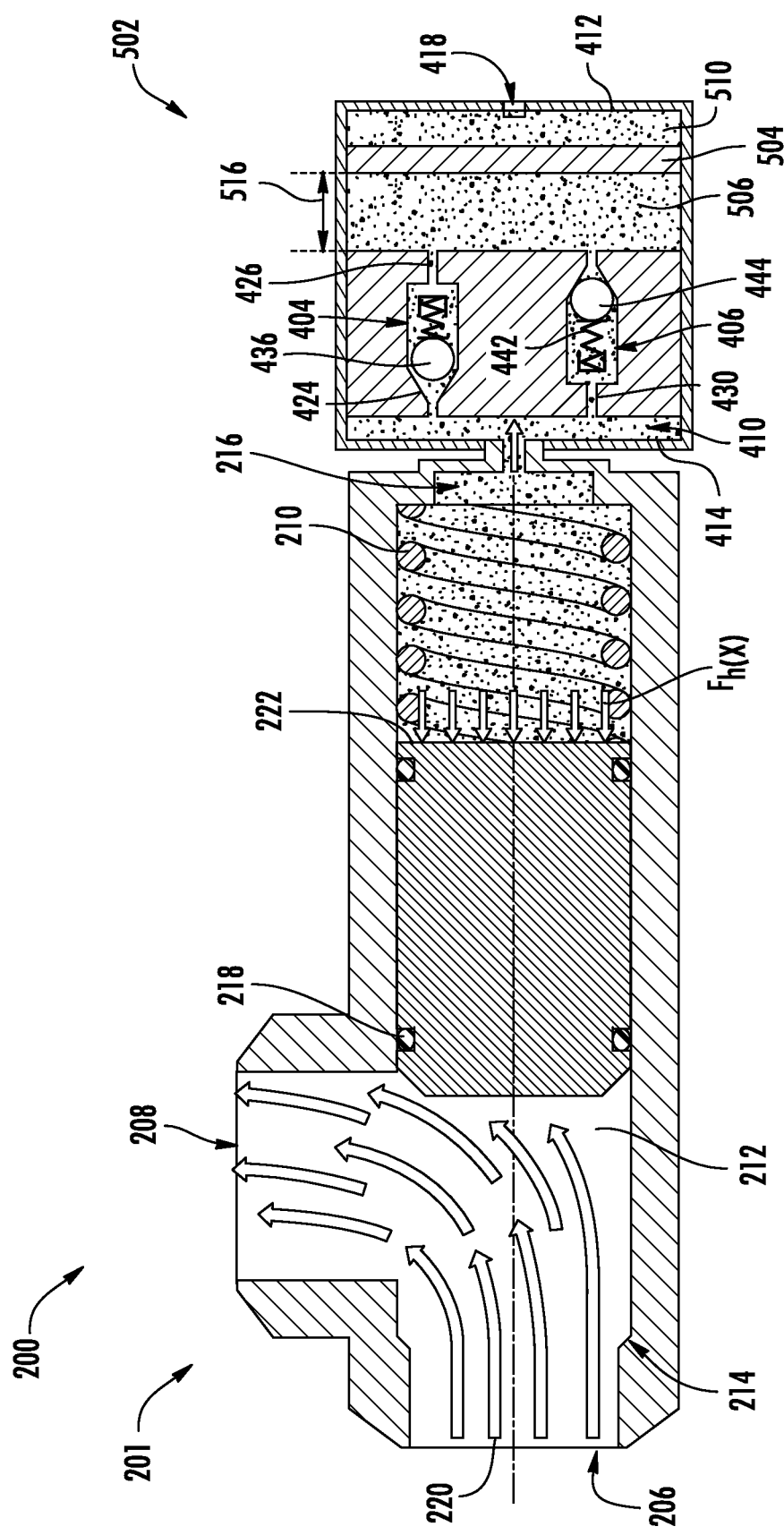
FIG. 8 depicts a functional diagram of the flow control assembly of FIG. 6 with the valve assembly in an open position and the damper assembly in an outflow damper position.
Figure 9:
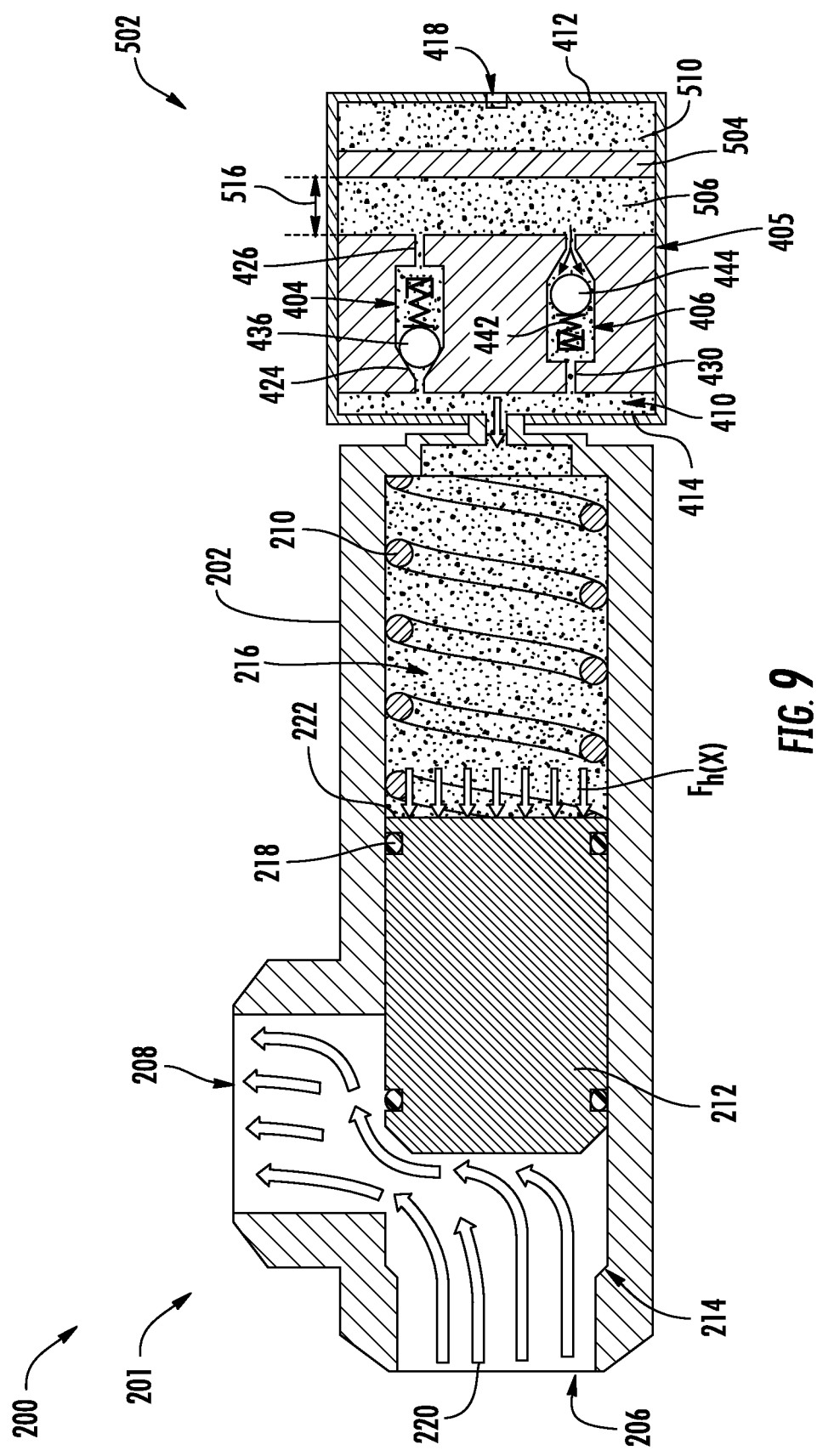
FIG. 9 depicts a functional diagram of the flow control assembly of FIG. 6 with the valve assembly in an open position and the damper assembly in an inflow damper position.

FIGS. 7-9 show the flow control assembly 200 in situ (without hose and pipeline attached). FIG. 7 shows the valve assembly 201 in its closed position, and the damper assembly 502 shown in the closed damper position. FIG. 8 shows the valve assembly 201 in a downstream movement state where the valve member 212 is moving downstream, as depicted by downstream movement arrow 115, with the valve assembly 201 in the open position and the damper assembly 502 in the outflow damper position. The damper assembly 502 operates in a similar manner as discussed with respect to the embodiments of FIGS. 1-5.

For example, a flexible hose (not shown) may be connected to valve inlet port 206 so that a fluid, depicted by arrows 220 in FIG. 7, flows towards the valve member 212 in a closed position. When the check valve cracking pressure is exceeded, the valve member 212 moves downstream, as shown in FIG. 8 and depicted by downstream movement arrow 115, to open the valve flowpath 226 extending between the valve inlet port 206 and the valve outlet port 208. The pressure interface surface 222 of the valve member 212 moves to the right in the damper interface flowpath 216. As the valve member 212 moves downstream, as depicted by downstream movement arrow 115, fluid in pressure interface flowpath 460 applies an outflow force against the first damper valve member 436 of the first damper check valve 404 to move the first damper valve member 436 away from the first damper valve seal surface 440. This results in the first damper check valve 404 moving from the inflow checked position to the outflow unchecked position. A fluid outflow of fluid from the damper interface flowpath 116 and the damper fluid chamber 410 flows through the first damper valve flowpath 420, through the first damper valve outlet 426, and into working fluid chamber 506.

The fluid entering the working fluid chamber 506 applies a pressure against damper piston 504 causing the damper piston 504 to move towards the damper assembly outlet 418, as depicted by piston outflow movement arrow 515. External fluid in external fluid outlet chamber 510 than flows out of damper assembly outlet 418. As the valve member 212 moves downstream, as depicted by downstream movement arrow 115, the second damper check valve 406 remains in the outflow checked position, and the damper assembly 402 is in the outflow damper position.

FIG. 9 depicts a functional diagram of the flow control assembly 200 of FIG. 6 when the valve assembly 201 is in an upstream movement state where the valve member 212 is moving upstream in the valve flowpath 226 with the valve assembly 201 in the open position and the damper assembly 502 in an inflow damper position. The valve member 212 moves from the open position, shown in FIG. 9, towards the closed position, shown in FIG. 7. A fluid pressure fluctuation in the valve flowpath 126 may cause the valve member 212 to move upstream, as depicted by upstream movement arrow 117 in FIG. 9.

As the valve member 212 moves upstream, as depicted by upstream movement arrow 117, the external fluid applies an inflow force against the damper piston 504 to move the damper piston 504 towards the damper valve assembly 405, as depicted by damper piston movement arrow 517. Working fluid in the working fluid chamber 506 than applies a force against the second damper valve member 444 to position the second damper check valve 406 from the outflow checked position to the inflow unchecked position. A fluid inflow from the working fluid chamber 506 flows through the second damper valve flowpath 422 and to the damper interface flowpath 216, as depicted by flow arrows 438. As the valve member 212 moves upstream, as depicted by upstream movement arrow 117, the first damper check valve 404 is in the inflow checked position and the damper assembly 402 is in the inflow damper position. The damper assembly 502 helps minimize fluttering of the valve member 212 between the open position and the closed position, as discussed previously with respect to the damper assembly 402, 502.

It is understood by the skilled person in the art that the valve biasing force $F_{s1}$ that is suitable to urge the valve member 112, 212 toward the valve seat surface 114, 214 may be provided by any suitable biasing member. It is further understood by the skilled person in the art that the first damper biasing force and the second damper biasing force may be provided by any suitable biasing member.

FIG. 10A depicts a first damper check valve 704 and FIG. 10B depicts a second damper check valve 706 according to one embodiment. The damper check valve 704, 706 includes some of the elements of damper check valve 404, 406 shown in FIGS. 1-9. In addition, the first damper check valve 704 is configured to have a first flow restrictor apparatus 710 and the second damper check valve 706 is configured to have a second flow restrictor apparatus 730. The flow restrictor apparatus 710, 730 are used to control the damping coefficient of the damper check valve 704, 706.

Referring to FIG. 10A, the first flow restrictor apparatus 710 includes two first restrictor members 712 that are identical, and a different second restrictor member 720, all disposed in the first damper valve flowpath 420. The first and second restrictor members 712, 720 may be in the form of disks or plates that may have different shapes. For example, the first and second restrictor members 712, 720 may be cylindrical disks. The first restrictor members 712 each have a first restrictor body 714 that defines a first restrictor opening 716. The second restrictor member 720 has a second restrictor body 722 that defines a second restrictor opening 724. As shown in FIG. 10A, the first restrictor opening 716 has a flow area that is larger than the flow area of second restrictor opening 724. For example, the first restrictor opening 716 has a diameter that is different, e.g. greater, than the diameter of the second restrictor opening 724. The first restrictor members 712 and the second restrictor member 722 are positioned in the first damper valve flowpath 420 to selectively restrict fluid flow through the first damper check valve 704. The restrictor members 712, 720 may be stacked adjacent one another so that the first flow restrictor apparatus 710 forms a first tuning flowpath. The first tuning flowpath is defined by the first restrictor openings 716 and the second restrictor opening 724. The first damper valve flowpath 420 passes through the restrictor openings 716, 724, and the restrictor openings 716, 724 are configured to restrict the first damper valve flowpath 420 and control the first damper coefficient of the first damper check valve 704.

Any number of restrictor members 712, 720, e.g. one or more, may be positioned in the first damper check valve 704 to control the damper coefficient. In one embodiment, one to ten or more restrictor members 712, 720 may be used. In addition, restrictor members 712, 720 having openings of a plurality of different sizes and flow areas may be selected. In addition, the thickness of the restrictor members 712, 720 may vary. The first damping coefficient for the first damper check valve 704 is adjustable by selecting the type and number of restrictor members 712, 720 to dispose in the first damper check valve 704.

Referring to FIG. 10B, the second flow restrictor apparatus 730 includes third restrictor members 732 that are identical and disposed in the second damper valve flowpath 422. The third restrictor members 732 each have a third restrictor body 734 that defines a third restrictor opening 736. The third restrictor opening 736 has a flow area that may be different than the flow area of the first restrictor opening 716 and the second restrictor opening 724 of the restrictor members 712, 720 shown in FIG. 10A. The third restrictor members 732 are positioned in the second damper valve flowpath 422 to selectively restrict fluid flow through the second damper check valve 706. The third restrictor members 732 may be stacked adjacent one another so that the second flow restrictor apparatus 730 forms a second tuning flowpath. The second tuning flowpath is defined by the third restrictor openings 736.

As discussed with respect to the first damper check valve 704, a second damping coefficient for the second damper check valve 706 is adjustable by selecting the type and number of restrictor members 712, 720, 732 to dispose in the second damper check valve 706. The second damper valve flowpath 422 passes through the restrictor openings 736 and the restrictor openings 736 are configured to restrict the second damper valve flowpath 422 and control the second damper coefficient of the second damper check valve 706.

The first damping coefficient may be different from the second damping coefficient. The first damper check valve 704 and the second damper check valve 706 may be used in the different embodiments discussed herein, including the embodiments shown in FIGS. 1-9.

Figure 11:
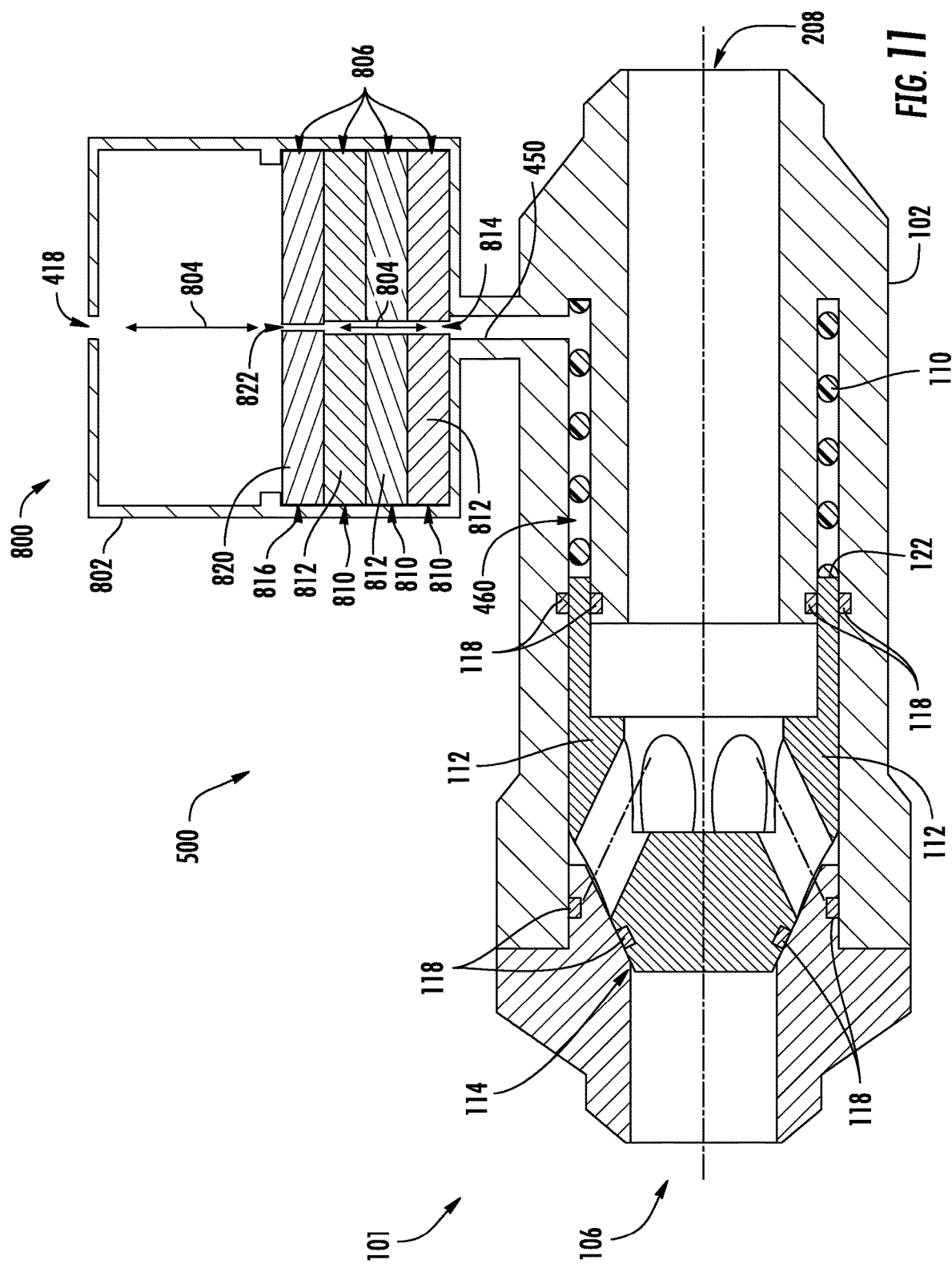
FIG. 11 depicts a flow control assembly with the valve assembly of FIG. 1 and a damper assembly according to one embodiment.

FIG. 11 depicts a flow control assembly 500 with the valve assembly 101 of FIG. 1 and a damper assembly 800 according to one embodiment. The damper assembly 800 is coupled to the valve assembly 101 as discussed with respect to FIGS. 1-5. The damper assembly 800 includes a side wall 802 that defines a damper chamber 808. The damper assembly 800 includes a damper interface flowpath 804 extending from the damper assembly outlet 418 to the damper assembly inlet 416. The damper assembly 800 includes a flow restrictor apparatus 806 disposed in the damper chamber 808. The flow restrictor apparatus 806, as shown in FIG. 11, includes three restrictor members 810 and one tuning restrictor 816. The restrictor members 810 each include a restrictor body 812 that each define a restrictor opening 814. The tuning restrictor 816 includes a restrictor body 820 that defines a restrictor opening 822.

The flow restrictor apparatus 806 disposed in the damper chamber 808 restricts the damper interface flowpath 804. The flow restrictor apparatus 806 operates in a similar manner as the flow restrictor apparatus 710, 730 of the embodiments shown in FIG. 10A and FIG. 10B. As discussed with respect to FIGS. 10A and 10B, the restrictor members 810, 816 may be selected to adjust the damping coefficient of the damper assembly 800. For example, the number of restrictor members 810, 816 may be selected to adjust the damping coefficient. For example, an increased number of restrictor members 810, 816 and using restrictor members 810, 816 with reduced flow areas would increase the damping coefficient of the damping assembly 800. A pressure interface flowpath 460 extends between the damper assembly outlet 418 and the pressure interface surface 122 of valve member 112. The damper interface flowpath 804 passes through the restrictor openings 814, 822 and the restrictor openings 814, 822 are configured to restrict the damper interface flowpath 804 and control a damper coefficient of the damper assembly 800. The damper interface flowpath 804 of the damper assembly 800 is configured to reduce oscillations of the valve member 112 in valve flowpath 126.

Figure 12:
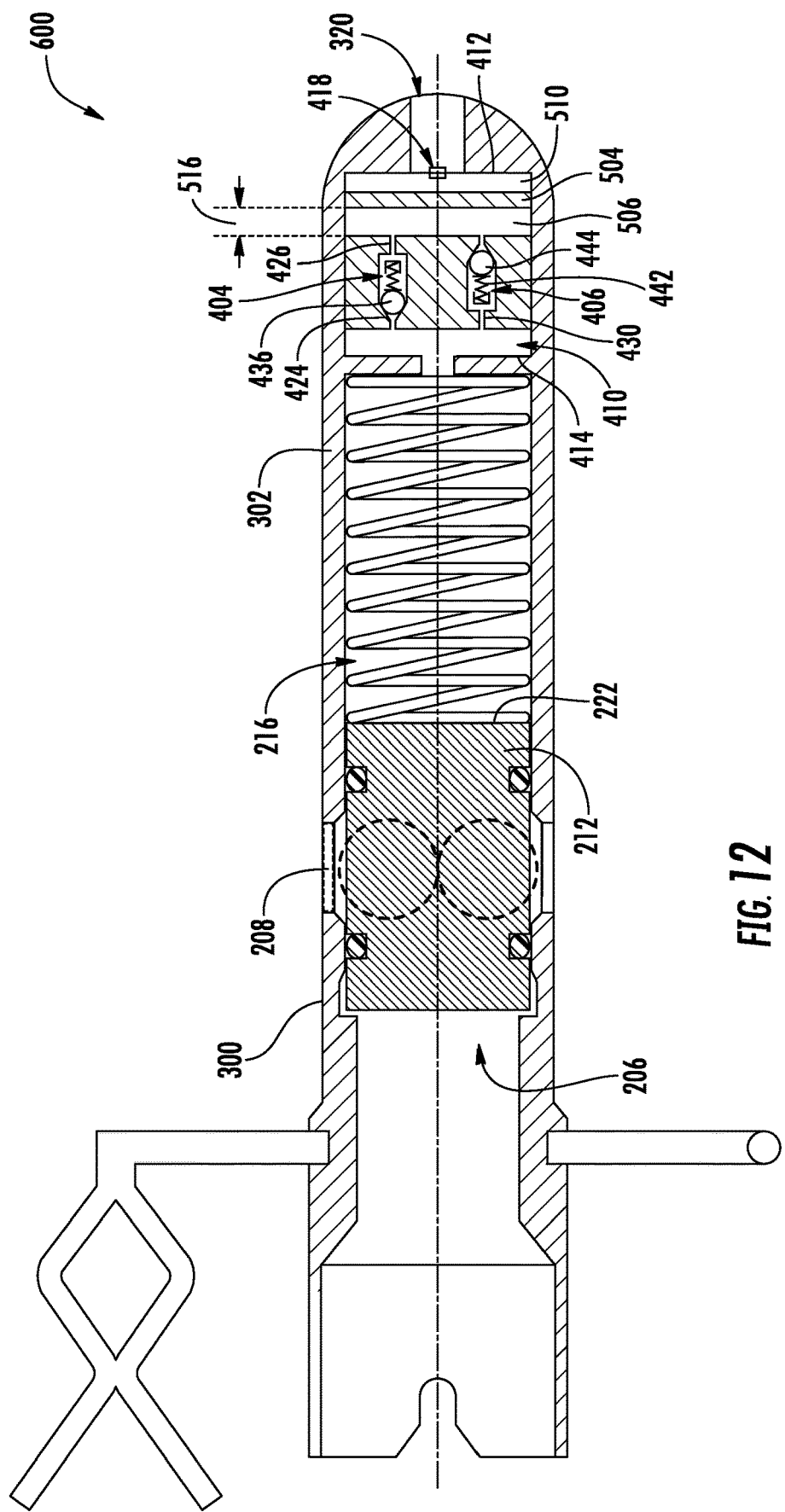
FIG. 12 shows a stab connector incorporating the flow control assembly according to one embodiment.

FIG. 12 shows a flow control assembly 600 that includes a stab connector 300. The flow control assembly 600 may comprise a damper assembly 402, 502 and a valve assembly 101, 201 in accordance with any one of the embodiments described herein disposed in the stab connector 300. The stab connector 300 incorporates a valve assembly 201 and a damper assembly 502 within its stab connector housing 302.

Figure 13:
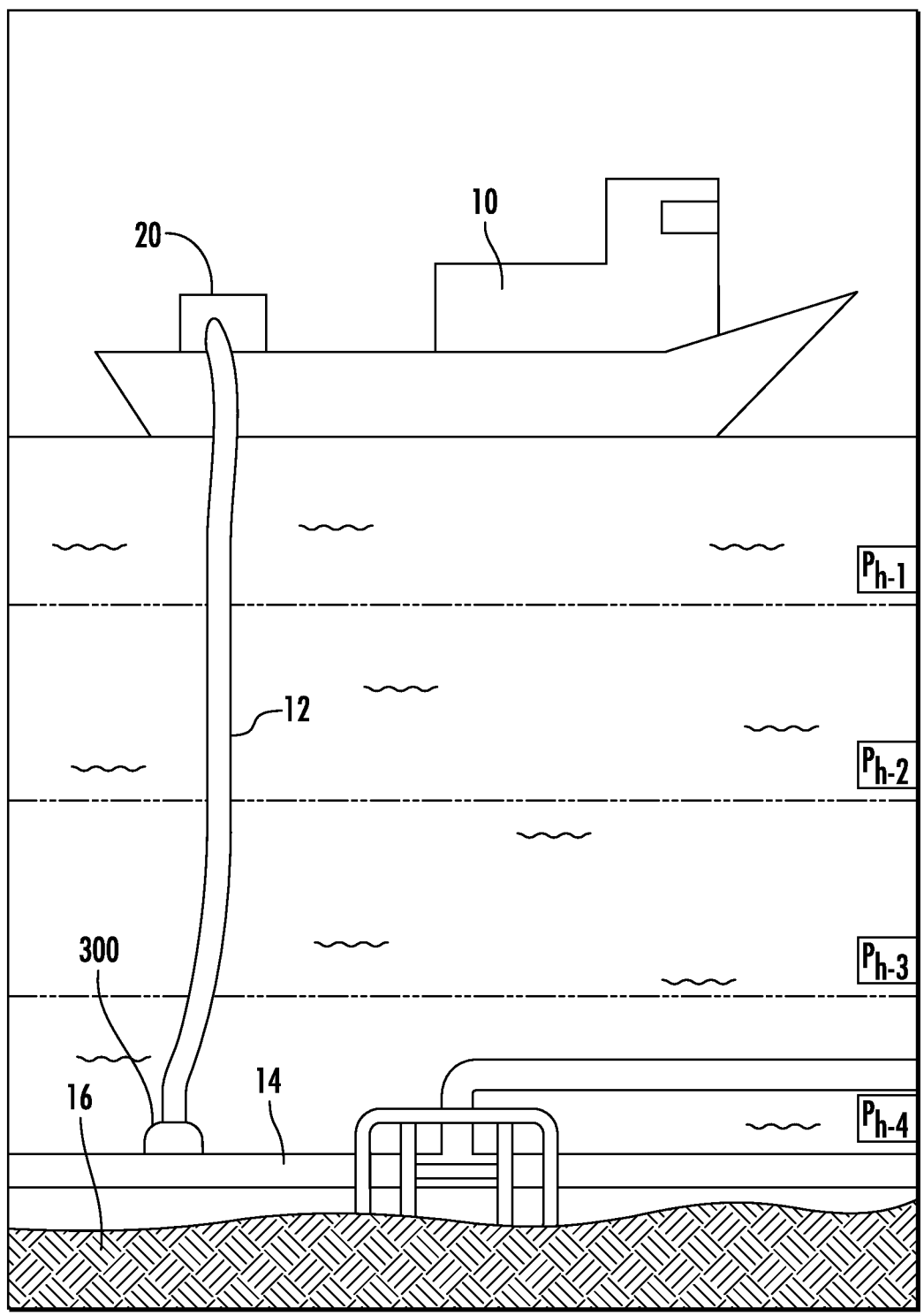
FIG. 13 shows an offshore setup when servicing a pipeline utilizing a flexible hose coupled to the stab connector incorporating the flow control assembly according to one embodiment.

Referring to FIGS. 12-13, the stab connector 300 is described in an application depicted in FIG. 13. During operation, the stab connector 300 is coupled to a hose 12 that is extended from a surface vessel 10 to a subsea pipeline 14 that has been laid on the seabed 16. Hose 12 is a flexible hose. The surface vessel 10 has a pump 20 coupled to the hose 12. The hose 12 is extended to a subsea location, where a diver or Remotely Operated Vehicle (ROV) inserts the stab connector 300 to a female coupling so as to form a fluid path between the hose 12 and the interior of the subsea pipeline 14. The hose 12 is coupled to an end of the stab connector 300 so that the hose 12 is in fluid communication with the valve inlet port 206.

A stab connector pressure interface opening 320 is provided at the distal end of the stab connector 300. The distal end of the stab connector 300 is disposed opposite an end of the stab connector that is in fluid communication with the valve inlet port 206. The stab connector pressure interface opening 320 is coupled to the damper assembly outlet 418 such that the stab connector pressure interface opening 320 is in fluid communication with the external fluid when the stab connector 300 is locked in the female coupling. The stab connector 300 has a stab connector housing 302. The stab connector pressure interface opening 320 in the stab connector housing 302 is adapted to couple to the external region. The valve housing 202 is disposed in the stab connector housing 302. The stab connector pressure interface opening 320 is coupled to and in fluid communication with the damper interface flowpath 216 disposed in the valve housing 202 and pressure interface surface 222. The valve member 212 is shown in the closed position where fluid is blocked from flowing from the valve inlet port 206 to the valve outlet port 208.

When the internal hose pressure $P_1$ exceeds the check valve cracking pressure provided by the force $F_{s1}$, the first damper biasing force $F_{d1}$ and the hydrostatic pressure $P_{h-x}$ at sub sea depth X, the valve member 212 moves into the open position, therefore creating a flowpath between the valve inlet port 206 and the valve outlet port 208 that extends through stab connector housing 302 to permit fluid flow into subsea pipeline 14. Any significant pressure drop in the hose 12 may cause the valve member 212 to move upstream towards its closed position, as discussed with respect to flow control assembly 200.

While the foregoing is directed to embodiments of the disclosure, other and further embodiments of the disclosure may be devised without departing from the basic scope thereof, and the scope thereof is determined by the claims that follow.

The invention claimed is:

1. A flow control assembly for subsea applications, comprising:
    a valve housing having an inlet port and an outlet port forming a valve flowpath through the valve housing;
    a valve member movable within the valve flowpath between a first position and a second position;
    a valve biasing member configured to urge the valve member towards the first position;
    a damper interface flowpath disposed in the valve housing; and
    a damper assembly comprising:
        a damper housing having an inlet in fluid communication with the damper interface flowpath and an outlet in fluid communication with a region external to the damper housing;
        a damper flowpath extending between the inlet and the outlet of the damper housing; and
        a damper valve assembly disposed in the damper housing and comprising:
            a first damper check valve having:
                a first damper valve flowpath disposed between a first damper valve inlet and a first damper valve outlet;
                a first damper valve member, a first damper biasing member retainer, and a first damper biasing member disposed in the first damper valve flowpath biasing the first damper valve member into a checked position; and
                a plurality of abutting flow restrictors disposed in the first damper valve flowpath, each flow restrictor having an interior opening to restrict working fluid flow through the first damper valve flowpath and control a damper coefficient of the damper assembly;
            a second damper check valve having:
                a second damper valve flowpath disposed between a second damper valve inlet and a second damper valve outlet;
                a second damper valve member, a second damper biasing member retainer, and a second damper biasing member disposed in the second damper valve flowpath biasing the second damper valve member into a checked position; and
                a plurality of abutting flow restrictors disposed in the second damper valve flowpath, each flow restrictor having an interior opening to restrict working fluid flow through the second damper valve flowpath and control the damper coefficient of the damper assembly; and
            a damper piston disposed in the damper housing that separates working fluid that flows through the damper valve assembly on one side and an external fluid from the region external to the damper housing on the opposite side.

2. The flow control assembly of claim 1, wherein the damper assembly further comprises an external fluid outlet chamber disposed between the damper piston and the outlet of the damper housing, and wherein at least a portion of the external fluid from the region external to the damper housing is disposed in the external fluid outlet chamber.

3. The flow control assembly of claim 2, wherein the damper assembly further comprises a working fluid chamber disposed between the damper piston and the inlet of the damper housing, wherein at least a portion of the working fluid is disposed in the working fluid chamber.

4. The flow control assembly of claim 1, wherein the first damper valve member is configured to check flow of the working fluid in one direction, and wherein the second damper valve member is configured to check flow of the working fluid in an opposite direction.

5. The flow control assembly of claim 1, wherein the interior opening of each flow restrictors disposed in the first damper valve flowpath is formed in a center of the flow restrictors.

6. The flow control assembly of claim 5, wherein the interior opening of each flow restrictors disposed in the second damper valve flowpath is formed in a center of the flow restrictor.

7. The flow control assembly of claim 1, wherein the plurality of abutting flow restrictors disposed in the first damper valve flowpath comprises a first flow restrictor member having a first interior opening, and a second flow restrictor member having a second interior opening, wherein the second interior opening has a diameter that is different than a diameter of the first interior opening.

8. The flow control assembly of claim 7, wherein the plurality of abutting flow restrictors disposed in the second damper valve flowpath comprises a first flow restrictor member having a first interior opening, and a second flow restrictor member having a second interior opening, wherein the second interior opening has a diameter that is different than a diameter of the first interior opening.

9. The flow control assembly of claim 1, wherein the plurality of abutting flow restrictors disposed in the first damper valve flowpaths comprise a plurality of stacked cylindrical disks.

10. The flow control assembly of claim 9, wherein the plurality of abutting flow restrictors disposed in the second damper valve flowpath comprise a plurality of stacked cylindrical disks.

11. The flow control assembly of claim 1, wherein the first damper valve member is a ball member, and wherein the first damper biasing member is a spring.

12. The flow control assembly of claim 11, wherein the second damper valve member is a ball member, and wherein the second damper biasing member is a spring.

13. The flow control assembly of claim 1, wherein the first damper biasing member has a first damper biasing force, wherein the second damper biasing member has a second damper biasing force, and wherein the first and second damper biasing forces are equal.

14. The flow control assembly of claim 1, wherein the first damper biasing member has a first damper biasing force, wherein the second damper biasing member has a second damper biasing force, and wherein the first and second damper biasing forces are not equal.

15. The flow control assembly of claim 1, wherein the damper piston is movable in one direction so that the first damper valve member is movable into an unchecked position while the second damper valve member remains in the checked position.

16. The flow control assembly of claim 15, wherein the damper piston is movable in an opposite direction so that the second damper valve member is movable into an unchecked position while the first damper valve member remains in the checked position.

* * * * *